(12) United States Patent
Luo et al.

(10) Patent No.: US 9,383,472 B2
(45) Date of Patent: Jul. 5, 2016

(54) POSITION-SENSITIVE GAMMA DETECTORS

(71) Applicant: Halliburton Energy Services, Inc., Houston, TX (US)

(72) Inventors: Da Luo, Houston, TX (US); Weijun Guo, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/434,072

(22) PCT Filed: Dec. 30, 2013

(86) PCT No.: PCT/US2013/078264
§ 371 (c)(1),
(2) Date: Apr. 7, 2015

(87) PCT Pub. No.: WO2015/102570
PCT Pub. Date: Jul. 9, 2015

(65) Prior Publication Data
US 2016/0041299 A1    Feb. 11, 2016

(51) Int. Cl.
*G01V 5/04* (2006.01)
*E21B 47/09* (2012.01)
*G01T 1/164* (2006.01)

(52) U.S. Cl.
CPC . *G01V 5/04* (2013.01); *E21B 47/09* (2013.01); *G01T 1/1644* (2013.01)

(58) Field of Classification Search
CPC .................................. E21B 47/09; G01V 5/04
See application file for complete search history.

(56) References Cited

U.S. PATENT DOCUMENTS

| | | |
|---|---|---|
| 4,626,688 A | 12/1986 | Barnes |
| 2006/0027754 A1 | 2/2006 | Ramsden et al. |
| 2012/0307025 A1 | 12/2012 | Werner Lerche et al. |
| 2013/0279647 A1 | 10/2013 | Krupica et al. |
| 2013/0284894 A1 | 10/2013 | Freese et al. |

FOREIGN PATENT DOCUMENTS

WO    WO-2015102570 A1    7/2015

OTHER PUBLICATIONS

"International Application Serial No. PCT/US2013/078264, International Search Report mailed Oct. 7, 2014", 3 pgs.
"International Application Serial No. PCT/US2013/078264, Written Opinion mailed Oct. 7, 2014", 5 pgs.

*Primary Examiner* — Mark R Gaworecki
(74) *Attorney, Agent, or Firm* — Schwegman Lundberg & Woessner, P.A.; Benjamin Fite

(57) ABSTRACT

Various embodiments can include apparatus and methods to operate and provide a position-sensitive detector. In various embodiments, a detector may include an illuminating device, a photodetector array, and a number of elemental circuit units, where an arrangement of the number of elemental circuit units with the photodetector array can provide a mechanism to identify a position of a light generating event in the illuminating device. Additional apparatus, systems, and methods are disclosed.

36 Claims, 7 Drawing Sheets

US 9,383,472 B2

POSITION-SENSITIVE GAMMA DETECTORS

PRIORITY APPLICATIONS

This application is a U.S. National Stage Filing under 35 U.S.C. 371 from International Application No. PCT/US2013/078264, filed on 30 Dec. 2013, which application is incorporated herein by reference in its entirety.

TECHNICAL FIELD

The present invention relates generally to apparatus and methods of making and evaluating measurements.

BACKGROUND

In drilling wells for oil and gas exploration, understanding the structure and properties of the associated geological formation provides information to aid such exploration. A number of different measurements in a borehole can be performed to attain this understanding. Measurements may include using a neutron tool to make measurements to determine properties of a formation under investigation. Further, the usefulness, efficiency, and accuracy of traditional measurements may be related to the precision or quality of the techniques to attain and process data derived from such measurements. Techniques and apparatus to simplify measurements, to enhance processing of measured data, to enhance analysis of data from measurements to provide properties of a formation or borehole, or to provide combinations thereof can further aid in drilling operations.

DETAILED DESCRIPTION

The following detailed description refers to the accompanying drawings that show, by way of illustration and not limitation, various embodiments in which the invention may be practiced. These embodiments are described in sufficient detail to enable those skilled in the art to practice these and other embodiments. Other embodiments may be utilized, and structural, logical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

In various embodiments, a charge-dividing position-sensitive detector can be implemented for a number of applications including logging applications. A scintillation type gamma detector can be structured with enhanced features for the downhole nuclear logging applications. This detector is sensitive to the position of the received gamma rays, based on the charge-dividing principle of the structure of the detector.

Figure 1:
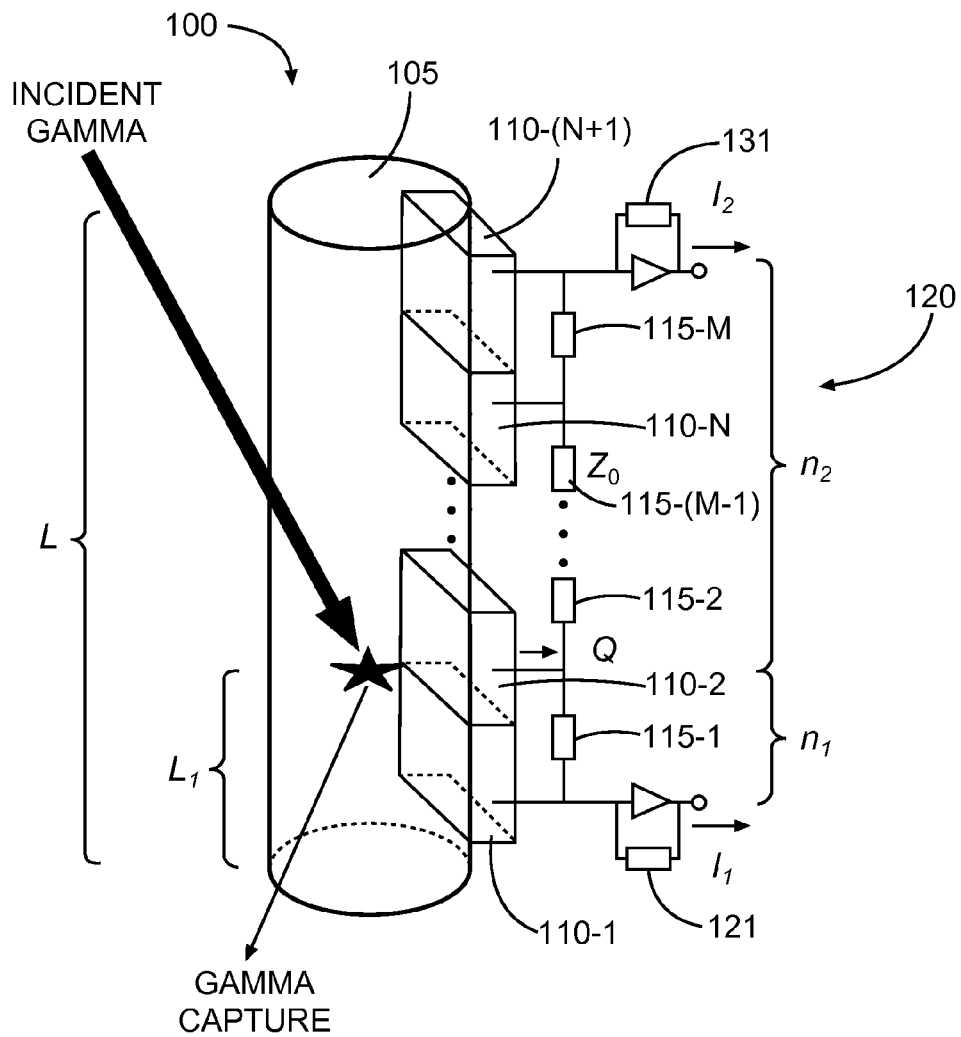
FIG. 1 illustrates an example detector, in accordance with various embodiments.

FIG. 1 shows features of an example embodiment of a detector 100. The detector 100 includes an illuminating device 105 structured to produce a light signal in response to reception of a gamma ray at a position in the illuminating device 105. The illuminating device 105 can be realized by a scintillator that produces the light signal in response to a gamma ray incident to the scintillator. The scintillator can be structured with a number of material compositions. For example, the scintillator can be composed of sodium iodide (NaI) or bismuth germanium oxide (BGO). Other scintillating materials may be used.

Detector 100 can include an array of photodetectors 110-1, 110-2, ... 110-N, 110-(N+1) arranged to receive the light signal and to provide a detected signal, and a number of a number of elemental circuit units 115-1, 115-2 ... 115-(M−1), 115-M, where the combination of photodetectors 110-1, 110-2, ... 110-N, 110-(N+1) and the elemental circuit units elemental circuit units 115-1, 115-2 ... 115-(M−1), 115-M operate as optical-electrical sensors, which produces an electrical signal in response to the light from the illuminating device 105. The array of photodetectors 110-1, 110-2 ... 110-N, 110-(N+1) may be structured, but not limited to, an array of segmented photodetectors.

The elemental circuit units 115-1, 115-2 ... 115-(M−1), 115-M can be coupled to the array of photodetectors 110-1, 110-2, ... 110-N, 110-(N+1) such that a signal detected by a photodetector from the light signal generated by the illuminating device 105 is divided into two signals by the elemental circuit units, a first signal of the two signals correlated to a first number, $n_1$, of the number of elemental circuit units and a second signal of the two signals correlated to a second number, $n_2$, of the number of elemental circuit units, $n=n_1+n_2$. As shown in FIG. 1, the first number $n_1$ is correlated to the number of elemental circuit units related to the distance from the location of the capture of the gamma ray to the bottom of the illuminating device 105 and the second number $n_2$ is correlated to the number of elemental circuit units related to the distance from the location of the capture of the gamma ray to the top of the illuminating device 105. A processing unit can be arranged to determine the position relative to a length of the illuminating device 105 based on the first number, the second number, and a ratio of the two signals.

Figure 2A:
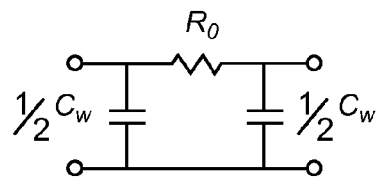
FIG. 2A depicts an example resistive-based unit used with associated photodetectors to provide position-sensitive detection, in accordance with various embodiments.
Figure 2B:
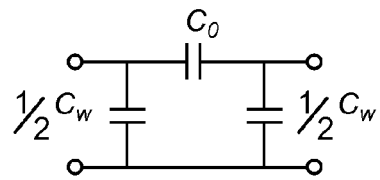
FIG. 2B shows a capacitance-based unit used with associated photodetectors to provide position-sensitive detection, in accordance with various embodiments.

Each of the elemental circuit units 115-1, 115-2 ... 115-(M−1), 115-M can include a resistive-based or a capacitive-based circuit to divide the charges from photodetectors 110-1, 110-2 ... 110-N, 110-(N+1). FIG. 2A shows a resistive-based unit for each of the elemental circuit units 115-1, 115-2 ... 115-(M−1), 115-M with resistance $R_0$, where $C_w$ is the capacitance of the electrodes to the associated photodetectors. FIG. 2B shows a capacitance-based unit for each of the elemental circuit units 115-1, 115-2 ... 115-(M−1), 115-M with capacitance $C_0$, where $C_w$ is the capacitance of the electrodes to the associated photodetectors. The number of photodetectors of the array of photodetectors 110-1, 110-2, . . . 110-N, 110-(N+1) can be selected to be one more than the number of elemental circuit units elemental circuit units 115-1, 115-2 . . . 115-(M−1), 115-M, that is, M=N, which provides a total number, N, of optical-electrical sensors.

Together with the photodetectors, the charge-division circuit of the elemental circuit units 115-1, 115-2 . . . 115-(M−1), 115-M can be modeled as an assembly of M elemental units, each with an equivalent impedance of $Z_0$. For each unit, the natural logarithm of the input/output voltage ratio can be defined as the transduction exponent, k. $Z_0$ and k can be calculated according to the following equations, for resistive and capacitive cases:

$$Z_0 = \begin{cases} \sqrt{\dfrac{R_0}{C_w\left(1 + \dfrac{1}{4}R_0 C_w\right)}} \\ \sqrt{\dfrac{1}{C_0 C_w + \dfrac{1}{4}C_w^2}} \end{cases}$$

$$k = \begin{cases} \cosh^{-1}\left(1 + \dfrac{1}{2}R_0 C_w\right) \\ \cosh^{-1}\left(1 + \dfrac{1}{2}\dfrac{C_w}{C_0}\right) \end{cases}$$

The capture of an incident gamma ray can occur inside of a scintillator used as the illuminating device 105, at the position of $L_1$ along the total length L of the illuminating device 105. The capture event at the position $L_1$ provides the activation to illuminate the photodetectors and generate the charge Q. Through a circuit 120 including the elemental circuit units 115-1, 115-2 . . . 115-(M−1), 115-M arranged in serial fashion, two signal currents $I_1$ and $I_2$ can be acquired on the far ends of circuit 120. The currents $I_1$ and $I_2$ can be output form amplifiers 121 and 131, respectively, coupled at opposite ends of the elemental circuit units 115-1, 115-2 . . . 115-(M−1), 115-M connected together consecutively. The ratio of $I_1$ to $I_2$ can be given by:

$$\frac{I_1}{I_2} = \frac{\sinh(n_2 k)}{\sinh(n_1 k)} = \frac{\sum_{m=0}^{\infty} \dfrac{(n_2 k)^{2m+1}}{(2m+1)!}}{\sum_{m=0}^{\infty} \dfrac{(n_1 k)^{2m+1}}{(2m+1)!}}$$

where $n_1 + n_2 = n_T$ that equals the total number of elemental circuit units. With $I_1$ and $I_2$ determined/measured from the circuit 120, $n_1$ and $n_2$ can be calculated. Then, the position information of the capture event is given by:

$$L_1 = \frac{n_1}{n_1 + n_2} L.$$

The position information can be generated by a processing unit operating on results of measuring $I_1$ and $I_2$ with the total number of elemental circuit units provided as a parameter input.

Figure 3:
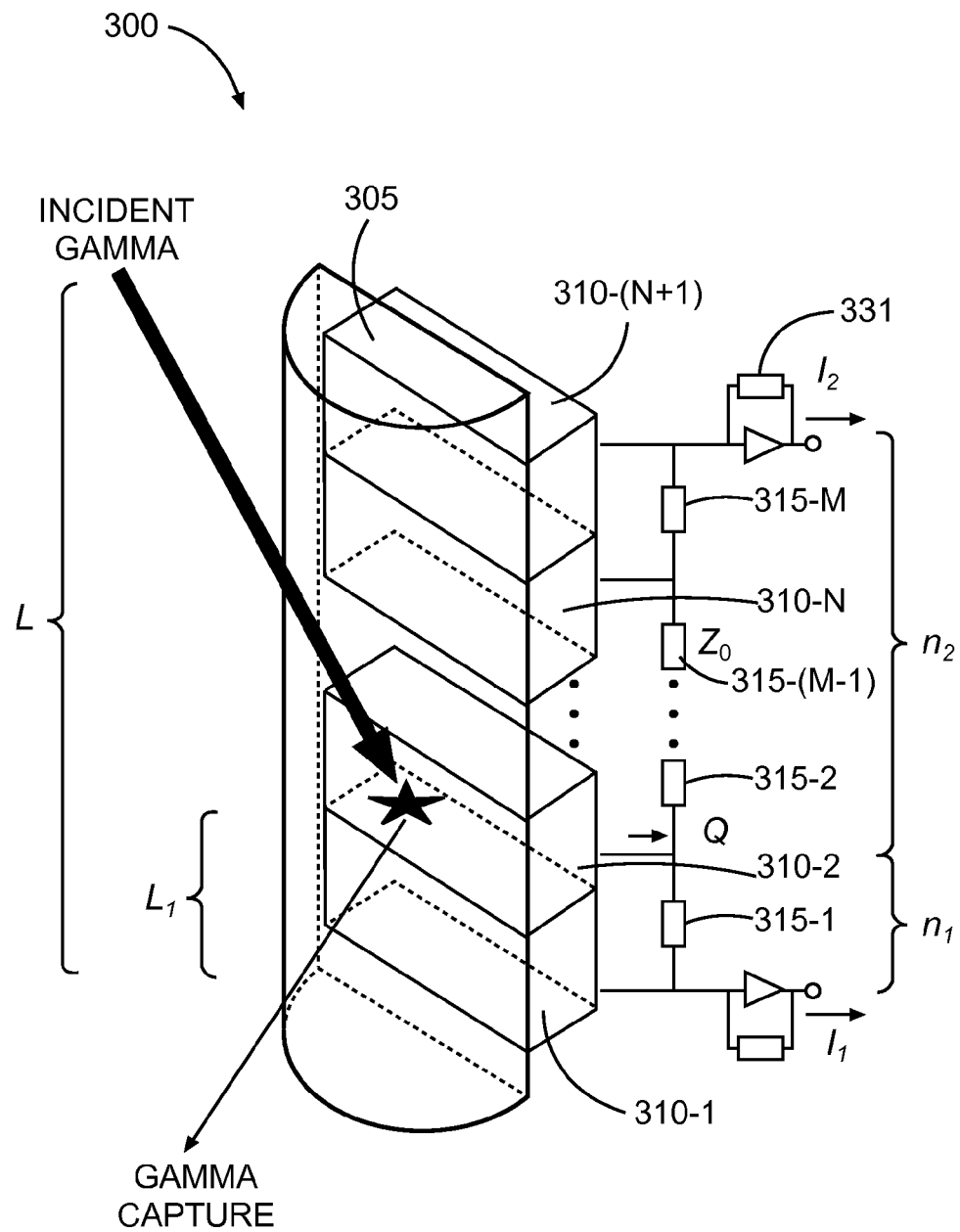
FIG. 3 illustrates an example detector having a half-cylinder shaped scintillator, in accordance with various embodiments.

In FIG. 1, the illuminating device 105 is shown as a cylinder shape. However, the illuminating device 105 can have other shapes or formats. A scintillator used as an illuminating device is not limited to a cylinder shape. FIG. 3 shows a half-cylinder shaped scintillator deployed as an illuminating device 305 of a detector 300. The half-cylinder can be structured as being along a longitudinal axis of an associated cylinder. Photodetectors 310-1, 310-2 . . . 310-N, 310-(N+1) can be coupled to the cross section of the half-cylinder shaped scintillator 305. This arrangement allows the effective light emitting area of the scintillator 305 to be maximized. Elemental circuit units 315-1, 315-2 . . . 315-(M−1), 315-M can be coupled to the photodetectors 310-1, 310-2, . . . 310-N, 310-(N+1) in a manner similar or identical to the coupling architecture of FIG. 1 including the use of resistive-based or a capacitive-based circuits as shown in FIGS. 2A-2B and the use of amplifiers 321 and 331. The positional information $L_1$ of the gamma event incident at the illuminating device 305 with length L can be determined in the same or similar manner with respect to the number of elemental circuit units as with discussed with respect to FIG. 1.

Figure 4:
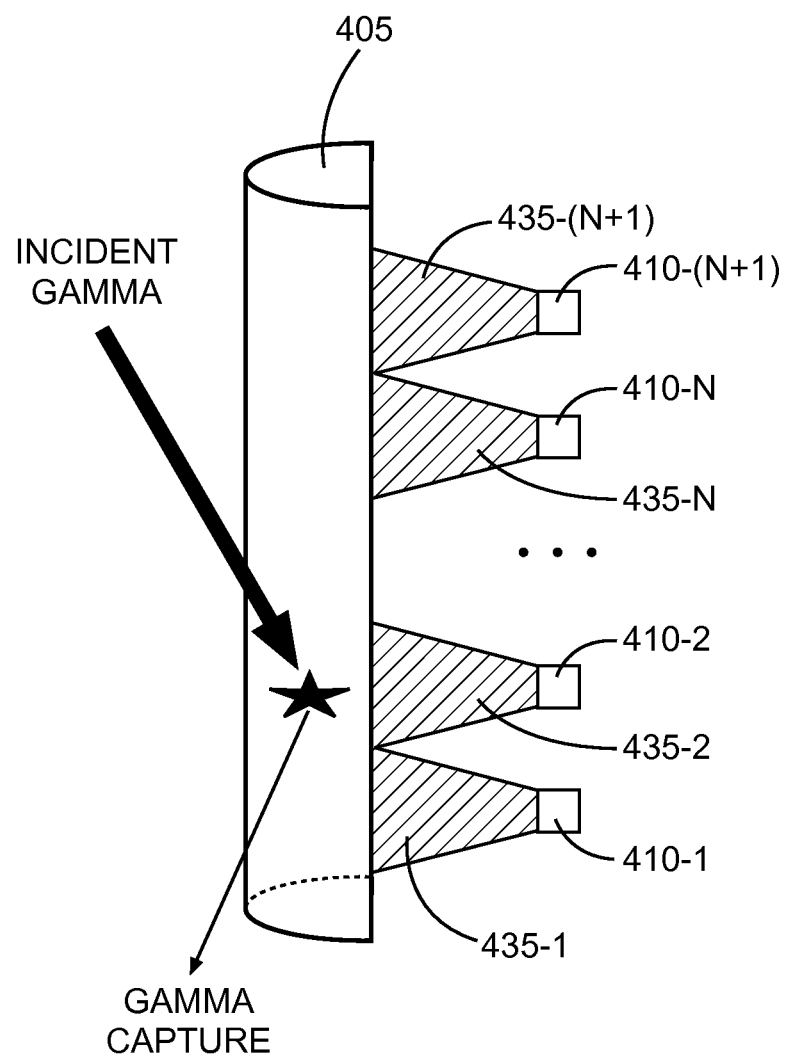
FIG. 4 illustrates an example detector having light guides to couple an illuminating device with an array of photodetectors, in accordance with various embodiments.

FIGS. 1 and 3 show an illuminating device, such as a scintillator, directly coupled to an array of photodetectors by directly contacting the array of photodetectors or being spaced apart at such a short distance such that the coupling is substantially equivalent to direct contact. Other architecture arrangements to couple light from the illuminating device to the array of photodetectors can be used. FIG. 4 shows a detector 400 that has a configuration that uses light guides to couple each photodetector with different area of the light emitting surface along the scintillator. The light guide can be, but not limited to, optical glass, optic fiber bundle, or other types that provide optical confinement along a desired path. The use of light guides provides a flexible architectural arrangement. This architectural arrangement allows a large sized scintillator to be matched with compact photodetectors.

The detector 400 includes illuminating device 405 coupled to an array of photodetectors 410-1, 410-2 . . . 410-N, 410-(N+1) by a plurality of light guides 435-1, 435-2 . . . 435-N, 435-(N+1). Each one of the light guides 435-1, 435-2 . . . 435-N, 435-(N+1) can be arranged to direct a light signal from the illuminating device to a different respective photodetector of the array of photodetectors 410-1, 410-2 . . . 410-N, 410-(N+1). Each one of the light guides 435-1, 435-2 . . . 435-N, 435-(N+1) can correspond to different portion of the illuminating device 405 such that each of the photodetectors 410-1, 410-2 . . . 410-N, 410-(N+1) detect light generated from theses different portions of the illuminating device 405. Elemental circuit units can be coupled to the photodetectors 410-1, 410-2 . . . 410-N, 410-(N+1) in a manner similar or identical to the coupling architecture of FIG. 1 including the use of resistive-based or a capacitive-based circuits as shown in FIGS. 2A-2B and the use of amplifiers 121 and 131. The positional information of the gamma event incident at the illuminating device 405 can be determined in the same or similar manner with respect to the number of elemental circuit units as with discussed with respect to FIG. 1.

Figure 5:
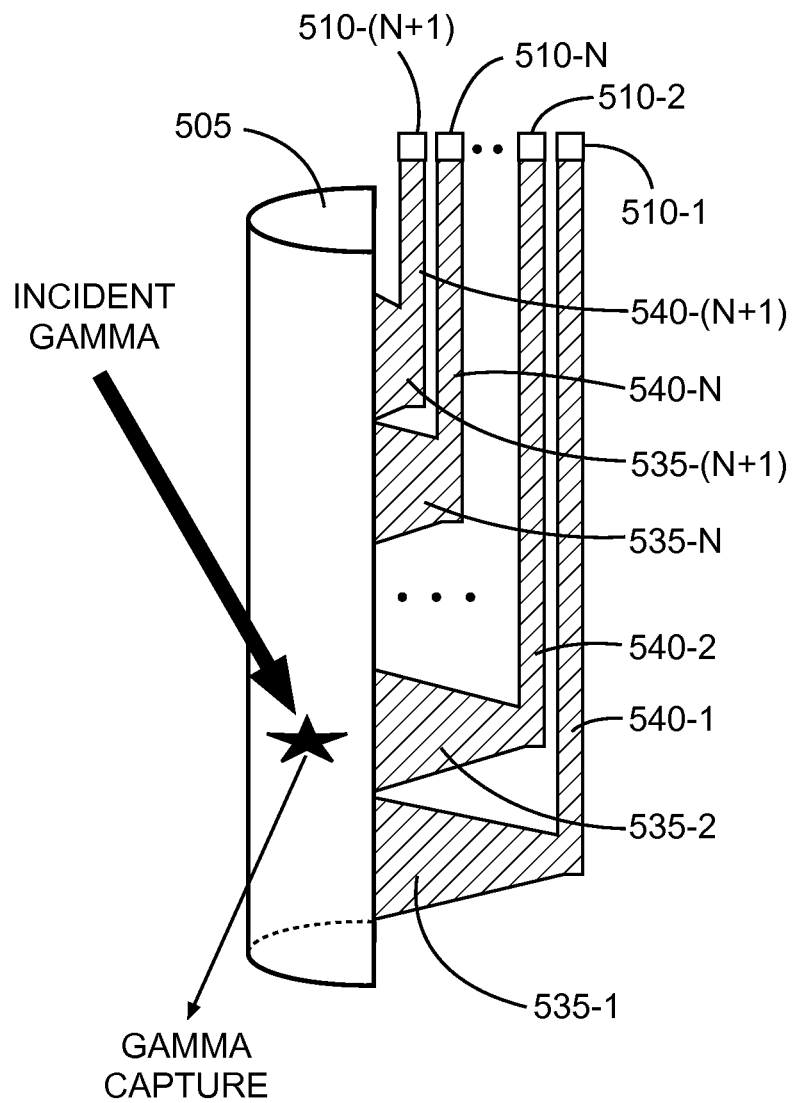
FIG. 5 illustrates an example detector having optical fibers to couple an illuminating device with an array of photodetectors, in accordance with various embodiments.

FIG. 5 shows a detector 500 that has a configuration that uses a plurality of optical fibers to couple each photodetector of an array of photodetectors with different area of the light emitting surface along a scintillator. This architectural arrangement allows a large sized scintillator to be matched with compact photodetectors.

The detector 500 includes illuminating device 505 coupled to an array of photodetectors 510-1, 510-2 . . . 510-N, 510-(N+1) by optical fibers 540-1, 540-2 . . . 540-N, 540-(N+1). Each one of the optical fibers 540-1, 540-2 . . . 540-N, 540-(N+1) arranged to direct a light signal from the illuminating device to a different respective photodetector of the array of photodetectors 510-1, 510-2 . . . 510-N, 510-(N+1). Each of the optical fibers 540-1, 540-2 . . . 540-N, 540-(N+1) can correspond to different portion of the illuminating device 505 such that each of the photodetectors 510-1, 510-2 . . . 510-N, 510-(N+1) detect light generated from these different portions of the illuminating device 505. Each of the optical fibers 540-1, 540-2 . . . 540-N, 540-(N+1) can be coupled to its associated photodetectors 510-1, 510-2 . . . 510-N, 510-(N+1) by a respective optical fiber bundle 535-1, 535-2 . . . 535-N, 535-(N+1). Use of optical fibers allows the illuminating device 505 to be separated from the array of photodetectors 510-1, 510-2 . . . 510-N, 510-(N+1) by relatively large distances. Elemental circuit units can be coupled to the photodetectors 510-1, 510-2, . . . 510-N, 510-(N+1) in a manner similar or identical to the coupling architecture of FIG. 1 including the use of resistive-based or a capacitive-based circuits as shown in FIGS. 2A-2B and the use of amplifiers 121, 131. The positional information of the gamma event incident at the illuminating device 505 can be determined in the same or similar manner with respect to the number of elemental circuit units as with discussed with respect to FIG. 1.

Each of the detectors 100, 300, 400, and 500 can be calibrated in a multiple step calibration. Each of these detectors include a number of elemental circuit units, where in various applications each elemental circuit unit has the same impedance as the other elemental circuit unit in a circuit with an array of photodetectors. For variations in impedance among the elemental circuit units, electronics for the detectors can be used to adjust for these variations. The photodetectors in the array of photodetectors can be calibrated to adjust for variations in the efficiencies of photon to current conversion among the photodetectors. In addition, the overall arrangement of an array of photodetectors with a number of elemental circuit units can be calibrated on a system basis. The calibration adjustments may be contained in a processing unit that is used to provide position information of a gamma event in an illuminating device of the detectors from measurements using the arrangement of an array of photodetectors with a number of elemental circuit units as taught herein.

Traditional gamma logging tools utilize at least two gamma detectors at discrete spots relative to the gamma source, and analyze the two detector readings to compensate the bore hole effects. The position sensitive detector, as taught herein, can provide enhancements to traditional gamming logging tools. Such position sensitive detectors can measure the location of a light spot that corresponds to a gamma capture event. The light transmission path inside of the scintillator is much shortened. So using a single detector along the tool axis, not only the signal strength but also the continuous location information of the gamma ray may be obtained. For nuclear logging, with the position information of the radiation acquired as discussed herein, a more detailed and precise calculation can be performed to study the respective formations.

Figure 6:
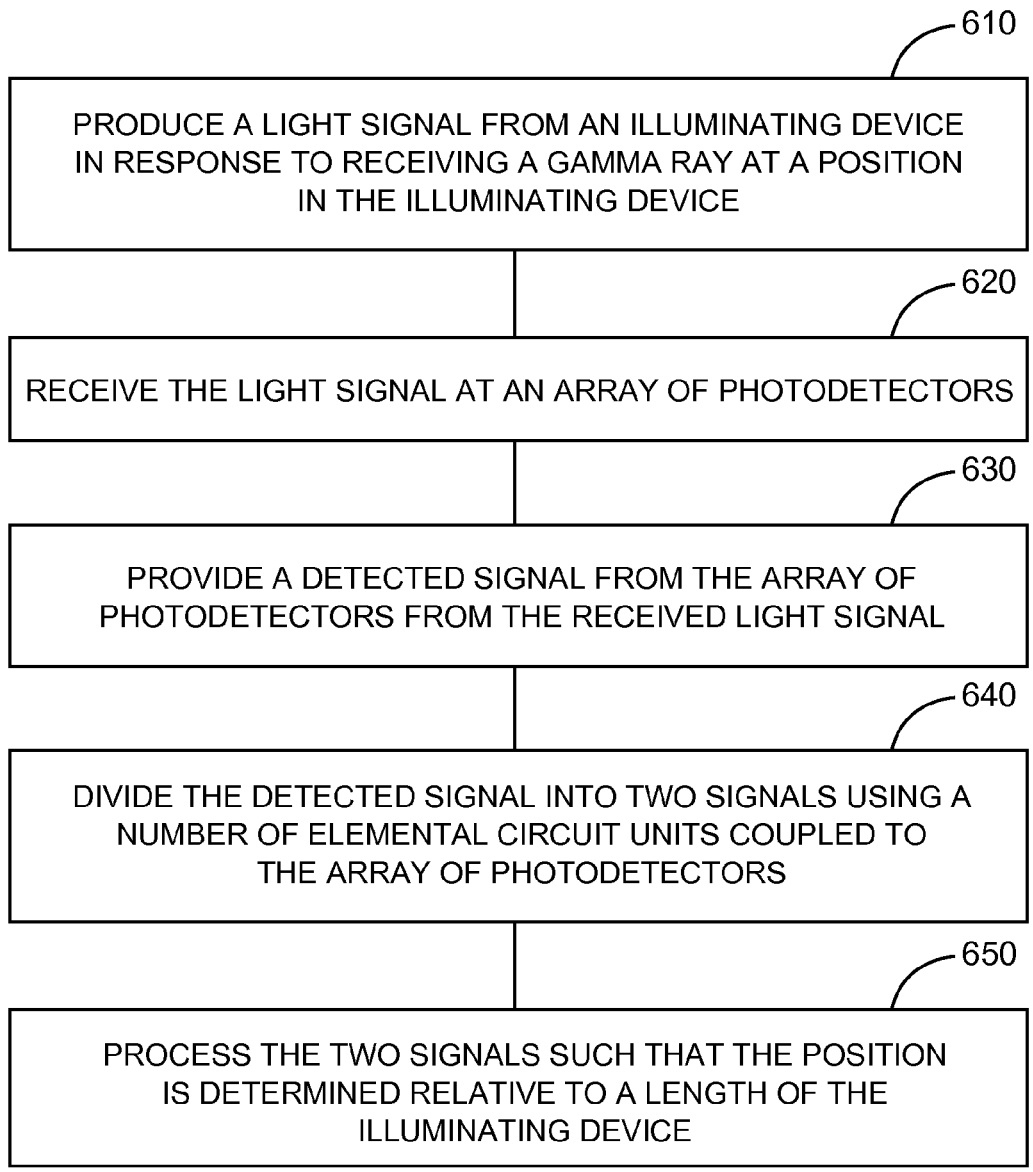
FIG. 6 shows features of an example method to determine a location of a gamma event in a tool, in accordance with various embodiments.

FIG. 6 shows features of an embodiment of an example method to determine a location of a gamma event in a tool. The method can include the operation of a position-sensitive apparatus similar or identical to apparatus discussed herein. At 610, a light signal is produced from an illuminating device in response to receiving a gamma ray at a position in the illuminating device. The illuminating device may a scintillator. The scintillator may have a material composition that includes bismuth germanium oxide or sodium iodide. The scintillator may have a cylindrical shape. The scintillator may have a half-cylindrical shape, where the half-cylinder is along a longitudinal axis of an associated cylinder.

At 620, the light signal is received at an array of photodetectors. In various embodiments, a plurality of light guides is used such that each one of the light guides can be arranged to direct a light signal from the illuminating device to a different respective photodetector of the array of photodetectors. A plurality of optical fibers can be used, where each one of the optical fibers can be arranged to direct a light signal from the illuminating device to a different respective photodetector of the array of photodetectors.

At 630, a detected signal is provided from the array of photodetectors from the received light signal. At 640, the detected signal is divided into two signals using a number of elemental circuit units coupled to the array of photodetectors. A first signal of the two signals can be correlated to a first number of the number of elemental circuit units and a second signal of the two signals can be correlated to a second number of the number of elemental circuit units. At 650, the two signals are processed such that the position is determined relative to a length of the illuminating device. The determination can be based on the first number, the second number, and a ratio of the two signals.

In various embodiments, the array of photodetectors can be realized as an array of segmented photodetectors. The array of photodetectors can have a number of photodetectors such that the number of photodetectors is one more than the number of elemental circuit units. Each of the number of elemental circuit units can include a resistive-based circuit or a capacitive-based circuit. Each of the number of elemental circuit units can have an equivalent impedance that is substantially equal to each other. The various methods of using a position-sensitive detector can include using a first amplifier arranged to output the first signal, where the second amplifier is coupled to one end of the number of elemental circuit units connected together consecutively; and using a second amplifier arranged to output the second signal, where the second amplifier is coupled to an opposite end of the number of elemental circuit units.

In various embodiments, components of a system are operable to conduct simulations of apparatus and methods, as described herein or in a similar manner. These implementations can include a machine-readable storage device having machine-executable instructions, such as a computer-readable storage device having computer-executable instructions, which instructions when executed cause a machine to perform operations. The operations can include simulations of operations to: produce a light signal from an illuminating device in response to receiving a gamma ray at a position in the illuminating device; receive the light signal at an array of photodetectors; provide a detected signal from the array of photodetectors from the received light signal; divide the detected signal into two signals using a number of elemental circuit units coupled to the array of photodetectors; and process the two signals such that the position is determined relative to a length of the illuminating device. The simulations may include simulation of one or more features of apparatus and methods of using the apparatus has taught herein. The simulations can be controlled by one or more processors based on instructions stored in one or more machine-readable storage devices.

In various embodiments, machine-readable storage device has instructions stored thereon, which, when performed by a machine, cause the machine to perform operations, the operations comprising operations to: process two signals resulting from a detected signal divided by a number of elemental circuit units coupled to an array of photodetectors, a first signal of the two signals correlated to a first number of the number of elemental circuit units and a second signal of the two signals correlated to a second number of the number of elemental circuit units, the detected signal provided by the array of photodetectors receiving a light signal produced by illuminating device in response to reception of a gamma ray at a position in the illuminating device; and determine the position relative to a length of the illuminating device based on the first number, the second number, and a ratio of the two signals. The illuminating device can be a scintillator. The scintillator can have a material composition including bismuth germanium oxide or sodium iodide. The scintillator can have a cylindrical shape. The scintillator can have a half-cylindrical shape, the half-cylinder being along a longitudinal axis of an associated cylinder.

The operations can include using a plurality of light guides, each one of the light guides arranged to direct a light signal from the illuminating device to a different respective photodetector of the array of photodetectors. The operations can include using a plurality of optical fibers, each one of the optical fibers arranged to direct a light signal from the illuminating device to a different respective photodetector of the array of photodetectors. The array of photodetectors can be an array of segmented photodetectors.

The machine-readable storage device can include a number of operations or features that can be used with different position-sensitive apparatus. The array of photodetectors can have a number of photodetectors such that the number of photodetectors is one more than the number of elemental circuit units. Each of the number of elemental circuit units can include a resistive-based circuit or a capacitive-based circuit. Each of the number of elemental circuit units can have an equivalent impedance such that each equivalent impedance is substantially equal to each other. Operations to process two signals can include operations to: process the first signal output from a first amplifier coupled to one end of the number of elemental circuit units connected together consecutively; and process the second signal output from a second amplifier coupled to an opposite end of the number of elemental circuit units. In addition, the instructions can include instructions to control the activation of the measurement process that uses the acquisition of a gamma ray in an illuminating device and to manage the schemes associated with the analysis of the signal and data associated with the measurement process.

Further, a machine-readable storage device, herein, is a physical device that stores data represented by physical structure within the device. Such a physical device is a non-transitory device. Examples of machine-readable storage devices can include, but are not limited to, read only memory (ROM), random access memory (RAM), a magnetic disk storage device, an optical storage device, a flash memory, and other electronic, magnetic, and/or optical memory devices.

Figure 7:
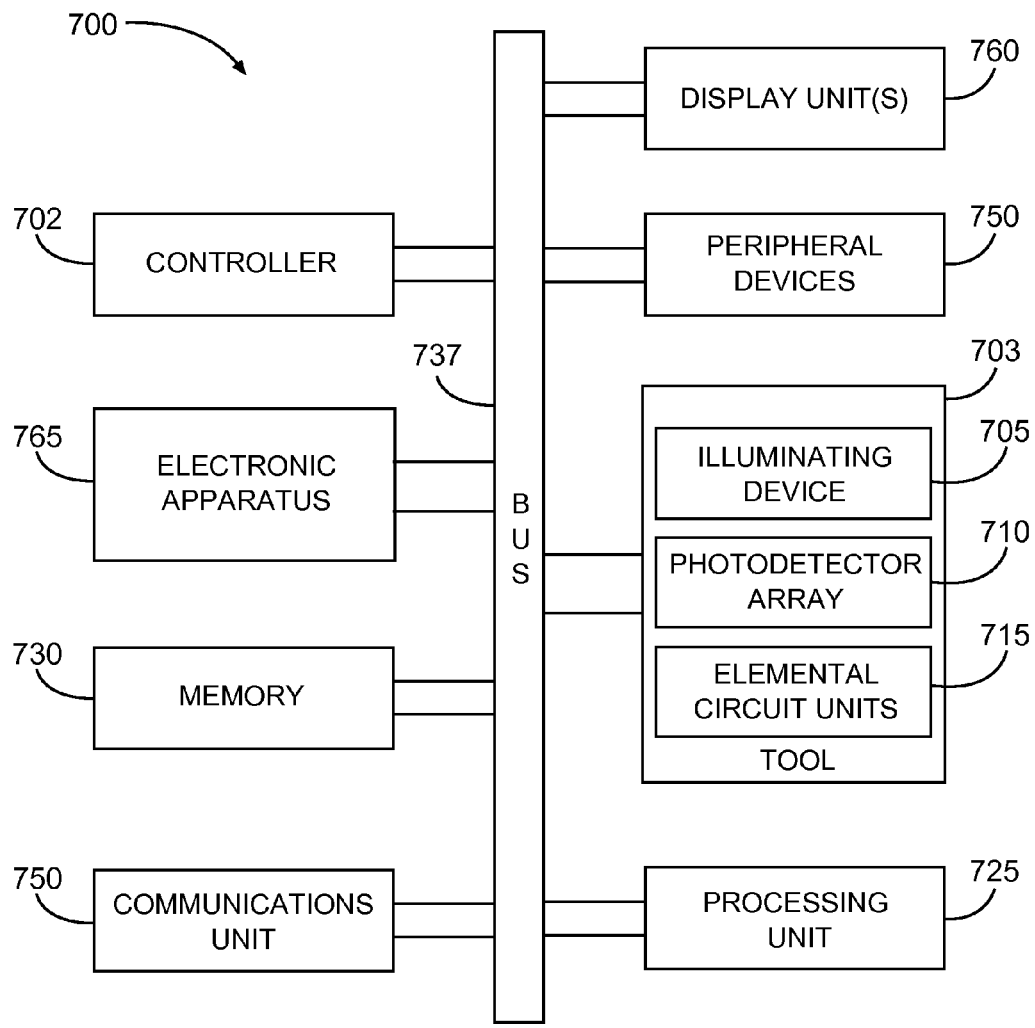
FIG. 7 depicts a block diagram of features of an example system operable to determine a location of a gamma event in a tool, in accordance with various embodiments.

FIG. 7 depicts a block diagram of an embodiment of features of an example system 700 operable with a position-sensitive detector, as described herein or in a similar manner. The system 700 can include a tool 703 having an arrangement of an illuminating device 705, photodetector array 710, and elemental circuit units 715 that can be realized in a similar or identical manner to arrangements and processing discussed herein.

The system 700 can include a controller 702, a memory 730, electronic apparatus 765, and a communications unit 750. The memory 730 may be structured to include a database. The controller 702, the memory 730, and the communications unit 750 can be arranged to operate as a processing unit to control operation of the tool 703 and to perform operations on the signals collected from outputs from an arrangement of the elemental circuit units 715 coupled to the photodetector array 710 that receives light from the illumination device 705 to conduct evaluations of an entity under investigation.

A processing unit 725, structured to conduct evaluation of an entity under investigation using one or more tools 703, can be implemented as a single unit or distributed among the components of the system 700 including electronic apparatus 765. The processing unit 725 can be structured to determine the position of a gamma event in the illuminating device 705 based on currents provided from a circuit arrangement of the elemental circuit units 715.

The electronic apparatus 765 can provide other circuitry for operation of the system 700. The controller 702 and the memory 730 can operate to control use of the tool 703 and to manage processing schemes associated with detection signals provided from photodetector array 710 via its arrangement with the elemental circuit units 715. The illuminating device 705, the photodetector array 710, and the elemental circuit units 715 can be configured, for example, to operate similar to or identical to components discussed herein or similar to or identical to any of methods discussed herein.

The communications unit 750 may include downhole communications for appropriately located sensors in a drilling operation. Such downhole communications can include a telemetry system. The communications unit 750 may use combinations of wired communication technologies and wireless technologies at frequencies that do not interfere with on-going measurements.

The system 700 can also include a bus 737, where the bus 737 provides electrical conductivity among the components of the system 700. The bus 737 can include an address bus, a data bus, and a control bus, each independently configured or in an integrated format. The bus 737 can be realized using a number of different communication mediums that allows for the distribution of components of the system 700. The bus 737 can include a network. Use of the bus 737 can be regulated by the controller 702.

In various embodiments, the peripheral devices 750 can include additional storage memory and other control devices that may operate in conjunction with the controller 702 and the memory 730. In an embodiment, the controller 702 can be realized as a processor or a group of processors that may operate independently depending on an assigned function.

The system 700 can include display unit(s) 760 as a distributed component that may be located remote from the entity under investigation using the tool 703, where the display unit(s) 760 can be used with instructions stored in the memory 730 to implement a user interface to monitor the operation of the tool 703 or components distributed within the system 700. The user interface may be used to input parameter values for thresholds such that the system 700 can operate autonomously substantially without user intervention in a variety of applications. The user interface can also provide for manual override and change of control of the system 700 to a user. Such a user interface can be operated in conjunction with the communications unit 750 and the bus 737.

Figure 8:
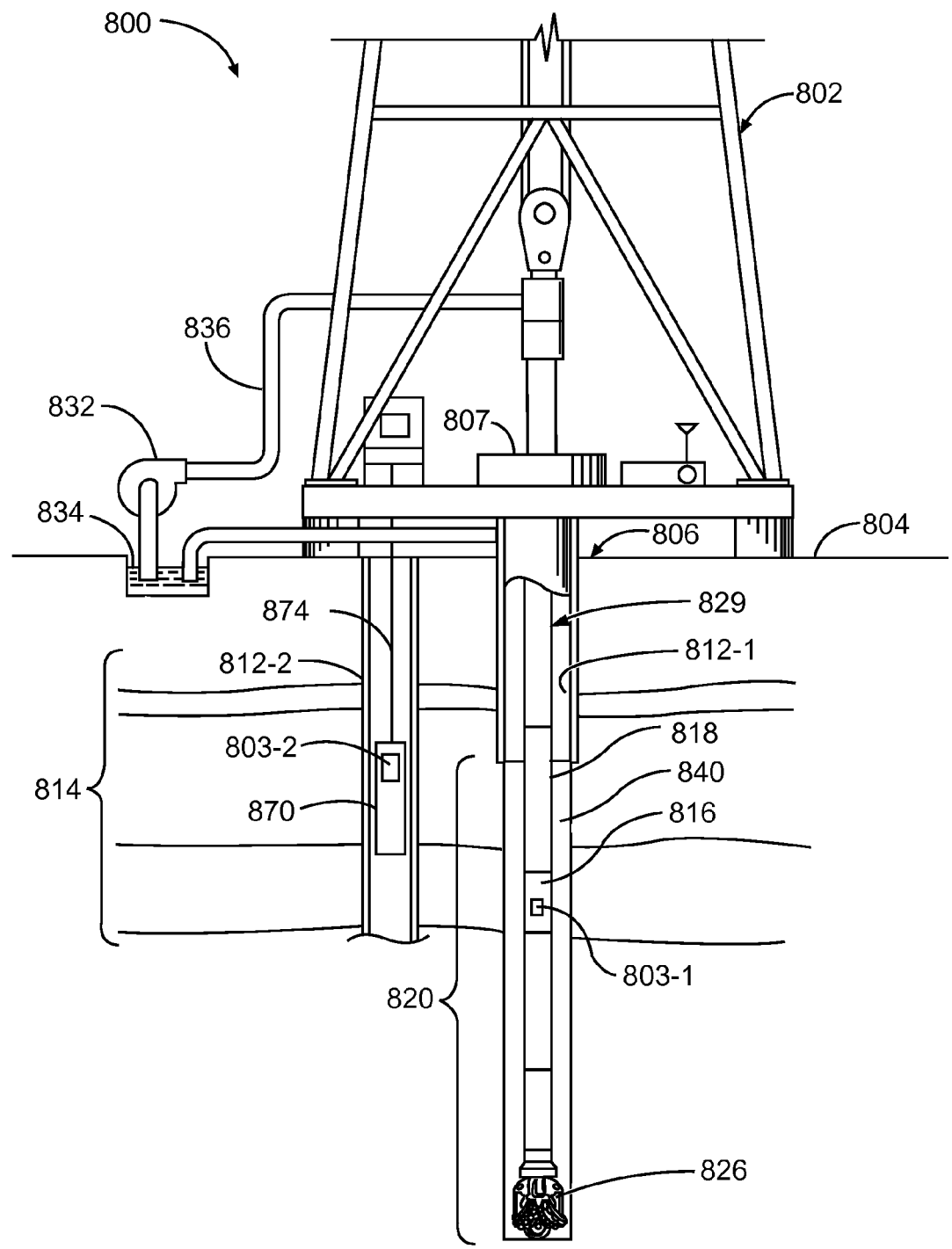
FIG. 8 depicts an example system at a drilling site, where the system is operable to determine a location of a gamma event in a tool, in accordance with various embodiments.

FIG. 8 depicts an example system 800 at a drilling site, where the system is operable with a position-sensitive detector, as described herein or in a similar manner. The system 800 can include a tool 803-1, 803-2, or both 803-1 and 803-2 to conduct measurements and analysis using one or more position-sensitive detectors as taught herein. Tools 803-1 and 803-2 can be realized in a similar or identical manner to arrangements taught herein.

System 800 can include a drilling rig 802 located at a surface 804 of a well 806 and a string of drill pipes, that is, drill string 829, connected together so as to form a drilling string that is lowered through a rotary table 807 into a wellbore or borehole 812-1. Drilling rig 802 can provide support for drill string 829. Drill string 829 can operate to penetrate rotary table 807 for drilling the borehole 812-1 through subsurface formations 814. Drill string 829 can include drill pipe 818 and a bottom hole assembly 820 located at the lower portion of drill pipe 818.

The bottom hole assembly 820 can include a drill collar 816 and a drill bit 826. Drill bit 826 can operate to create borehole 812-1 by penetrating the surface 804 and the subsurface formations 814. Bottom hole assembly 820 can include tool 803-1 attached to drill collar 816 to perform measurements to conduct formation evaluation. Tool 803-1 can be structured for an implementation in a measure-while-drilling (MWD) system such as a logging-while-drilling (LWD) system. The housing containing tool 803-1 can include electronics to control tool 803-1 and collect responses from optical-electrical sensors comprised of an arrangement of photodetectors and elemental circuit elements of tool 803-1. Such electronics may include a processing unit to provide analysis of the formation to the surface over a standard communication mechanism for operating in a well. Alternatively, electronics can include a communications interface to provide signals output by the arrangement of the photodetectors and elemental circuit elements of tool 803-1 to the surface over a standard communication mechanism for operating in a well, where these output signals can be analyzed at a processing unit at the surface.

During drilling operations, drill string 829 can be rotated by rotary table 807. In addition to, or alternatively, the bottom hole assembly 820 can also be rotated by a motor (e.g., a mud motor) that is located downhole. Drill collars 816 can be used to add weight to drill bit 826. Drill collars 816 also can stiffen the bottom hole assembly 820 to allow the bottom hole assembly 820 to transfer the added weight to drill bit 826, and in turn, assist drill bit 826 in penetrating surface 804 and subsurface formations 814.

During drilling operations, a mud pump 832 can pump drilling fluid (sometimes known by those of skill in the art as "drilling mud") from a mud pit 834 through a hose 836 into drill pipe 818 and down to drill bit 826. The drilling fluid can flow out from drill bit 826 and be returned to the surface 804 through an annular area 840 between drill pipe 818 and the sides of the borehole 812-1. The drilling fluid may then be returned to mud pit 834, where such fluid is filtered. In some embodiments, the drilling fluid can be used to cool drill bit 826, as well as to provide lubrication for drill bit 826 during drilling operations. Additionally, the drilling fluid may be used to remove subsurface formation 814 cuttings created by operating drill bit 826.

In various embodiments, tool 803-2 may be included in a tool body 870 coupled to a logging cable 874 such as, for example, for wireline applications. The tool body 870 containing the tool 803-2 can include electronics to control tool 803-2 and collect responses from optical-electrical sensors comprised of an arrangement of photodetectors and elemental circuit elements of tool 803-2. Such electronics can include a processing unit to provide analysis of the formation to the surface over a standard communication mechanism for operating in a well. Alternatively, electronics can include a communications interface to provide signals output by the arrangement of the photodetectors and elemental circuit elements of tool 803-2 to the surface over a standard communication mechanism for operating in a well, where these output signals can be analyzed at a processing unit at the surface. The logging cable 874 may be realized as a wireline (multiple power and communication lines), a mono-cable (a single conductor), and/or a slick-line (no conductors for power or communications), or other appropriate structure for use in the borehole 812-2. Though, for convenience, FIG. 8 depicts both an arrangement for wireline applications and an arrangement for LWD applications, the system 800 may be also realized for one of the two applications or both applications in a single well at different times.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. An apparatus comprising:
   an illuminating device structured to produce a light signal in response to reception of a gamma ray at a position in the illuminating device;
   an array of photodetectors arranged to receive the light signal and to provide a detected signal;
   a number of elemental circuit units coupled to the array of photodetectors such that the detected signal is divided into two signals by the elemental circuit units, a first signal of the two signals correlated to a first number of the number of elemental circuit units and a second signal of the two signals correlated to a second number of the number of elemental circuit units;
   a processing unit structured to determine the position relative to a length of the illuminating device based on the first number, the second number, and a ratio of the two signals.

2. The apparatus of claim 1, wherein the illuminating device is a scintillator.

3. The apparatus of claim 2, wherein the scintillator has a material composition including bismuth germanium oxide or sodium iodide.

4. The apparatus of claim 2, wherein the scintillator has a cylindrical shape.

5. The apparatus of claim 2, wherein the scintillator has a half-cylindrical shape, the half-cylinder being along a longitudinal axis of an associated cylinder.

6. The apparatus of claim 1, wherein the apparatus includes a plurality of light guides, each one of the light guides arranged to direct a light signal from the illuminating device to a different respective photodetector of the array of photodetectors.

7. The apparatus of claim 1, wherein the apparatus includes a plurality of optical fibers, each one of the optical fibers arranged to direct a light signal from the illuminating device to a different respective photodetector of the array of photodetectors.

8. The apparatus of claim 1, wherein the array of photodetectors is an array of segmented photodetectors.

9. The apparatus of claim 1, wherein the array of photodetectors has a number of photodetectors, the number of photodetectors being one more than the number of elemental circuit units.

10. The apparatus of claim 1, wherein each of the number of elemental circuit units includes a resistive-based circuit or a capacitive-based circuit.

11. The apparatus of claim 10, wherein each of the number of elemental circuit units has an equivalent impedance and each equivalent impedance is substantially equal to each other.

12. The apparatus of claim 1, wherein the apparatus includes two amplifiers, one of the two amplifiers arranged to output the first signal and coupled to one end of the number of elemental circuit units connected together consecutively, and the other one of the two amplifiers arranged to output the second signal and coupled to an opposite end of the number of elemental circuit units.

13. A method comprising:
producing a light signal from an illuminating device in response to receiving a gamma ray at a position in the illuminating device;
receiving the light signal at an array of photodetectors:
providing a detected signal from the array of photodetectors from the received light signal;
dividing the detected signal into two signals using a number of elemental circuit units coupled to the array of photodetectors, a first signal of the two signals correlated to a first number of the number of elemental circuit units and a second signal of the two signals correlated to a second number of the number of elemental circuit units; and
processing the two signals such that the position is determined relative to a length of the illuminating device, based on the first number, the second number, and a ratio of the two signals.

14. The method of claim 13, wherein the illuminating device is a scintillator.

15. The method of claim 14, wherein the scintillator has a material composition including bismuth germanium oxide or sodium iodide.

16. The method of claim 14, wherein the scintillator has a cylindrical shape.

17. The method of claim 14, wherein the scintillator has a half-cylindrical shape, the half-cylinder being along a longitudinal axis of an associated cylinder.

18. The method of claim 13, wherein the method includes using a plurality of light guides, each one of the light guides arranged to direct a light signal from the illuminating device to a different respective photodetector of the array of photodetectors.

19. The method of claim 13, wherein the method includes using a plurality of optical fibers, each one of the optical fibers arranged to direct a light signal from the illuminating device to a different respective photodetector of the array of photodetectors.

20. The method of claim 13, wherein the array of photodetectors is an array of segmented photodetectors.

21. The method of claim 13, wherein the array of photodetectors has a number of photodetectors, the number of photodetectors being one more than the number of elemental circuit units.

22. The method of claim 13, wherein each of the number of elemental circuit units includes a resistive-based circuit or a capacitive-based circuit.

23. The method of claim 22, wherein each of the number of elemental circuit units has an equivalent impedance and each equivalent impedance is substantially equal to each other.

24. The method of claim 13, wherein the method includes;
using a first amplifier arranged to output the first signal, coupled to one end of the number of elemental circuit units connected together consecutively; and
using a second amplifier arranged to output the second signal, the second amplifier coupled to an opposite end of the number of elemental circuit units.

25. A non-transitory machine-readable storage device having instructions stored thereon, which, when performed by a machine, cause the machine to perform operations, the operations comprising operations to:
process two signals resulting from a detected signal divided by a number of elemental circuit units coupled to an array of photodetectors, a first signal of the two signals correlated to a first number of the number of elemental circuit units and a second signal of the two signals correlated to a second number of the number of elemental circuit units, the detected signal provided by the array of photodetectors receiving a light signal produced by illuminating device in response to reception of a gamma ray at a position in the illuminating device; and
determine the position relative to a length of the illuminating device based on the first number, the second number, and a ratio of the two signals.

26. The non-transitory machine-readable storage device of claim 25, wherein the illuminating device is a scintillator.

27. The non-transitory machine-readable storage device of claim 26, wherein the scintillator has a material composition including bismuth germanium oxide or sodium iodide.

28. The non-transitory machine-readable storage device of claim 26, wherein the scintillator has a cylindrical shape.

29. The non-transitory machine-readable storage device of claim 26, wherein the scintillator has a half-cylindrical shape, the half-cylinder being along a longitudinal axis of an associated cylinder.

30. The non-transitory machine-readable storage device of claim 25, wherein the operations include using a plurality of light guides, each one of the light guides arranged to direct a light signal from the illuminating device to a different respective photodetector of the array of photodetectors.

31. The non-transitory machine-readable storage device of claim 25, wherein the operations include using a plurality of optical fibers, each one of the optical fibers arranged to direct a light signal from the illuminating device to a different respective photodetector of the array of photodetectors.

32. The non-transitory machine-readable storage device of claim 25, wherein the array of photodetectors is an array of segmented photodetectors.

33. The non-transitory machine-readable storage device device of claim 25, wherein the array of photodetectors has a number of photodetectors, the number of photodetectors being one more than the number of elemental circuit units.

34. The non-transitory machine-readable storage device of claim 25, wherein each of the number of elemental circuit units includes a resistive-based circuit or a capacitive-based circuit.

35. The non-transitory machine-readable storage device of claim 34, wherein each of the number of elemental circuit units has an equivalent impedance and each equivalent impedance is substantially equal to each other.

36. The non-transitory machine-readable storage device of claim 25, wherein operations to process two signals include operations to:
process the first signal output from a first amplifier coupled to one end of the number of elemental circuit units connected together consecutively; and
process the second signal output from a second amplifier coupled to an opposite end of the number of elemental circuit units.

* * * * *